United States Patent [19]

Ohmori et al.

[11] Patent Number: 4,615,584
[45] Date of Patent: Oct. 7, 1986

[54] OPTICAL MATERIAL

[75] Inventors: Akira Ohmori, Ibaraki; Nobuyuki Tomihashi, Takatsuki; Takahiro Kitahara, Settsu, all of Japan

[73] Assignee: Daikin Kogyo Co., Ltd., Japan

[21] Appl. No.: 799,296

[22] Filed: Nov. 20, 1985

Related U.S. Application Data

[63] Continuation of Ser. No. 617,480, Jun. 5, 1984, abandoned.

[30] Foreign Application Priority Data

Jun. 10, 1983 [JP] Japan ............... 58-104501
Feb. 13, 1984 [JP] Japan ............... 59-25852

[51] Int. Cl.[4] .................. C08F 210/02; G02B 5/14
[52] U.S. Cl. ................... 350/96.34; 526/245
[58] Field of Search ............ 526/245; 350/96.29, 350/96.30, 96.33, 96.34

[56] References Cited

U.S. PATENT DOCUMENTS 2,956,939 10/1960 Anspon ..................... 526/245
3,993,834 11/1976 Chimura et al. ............. 350/96.34
4,138,194 2/1979 Beasley et al. .............. 350/96.3
4,297,466 10/1981 Bloch et al. ................ 526/245

*Primary Examiner*—Harry Wong, Jr.
*Attorney, Agent, or Firm*—Larson and Taylor

[57] ABSTRACT

This invention relates to an optical material comprising a polymer which has a structural unit represented by the formula

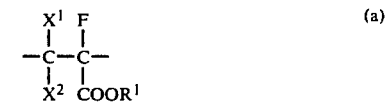

wherein $X^1$ and $X^2$ are the same or different and are each hydrogen or deuterium, and $R^1$ is a chain hydrocarbon group having 1 to 5 carbon atoms, a cyclic hydrocarbon group (with or without a substituted lower alkyl group) having 3 to 6 carbon atoms or a deuterium-substituted chain hydrocarbon group having 1 to 5 carbon atoms in an amount of at least 5 mole % of the polymer.

2 Claims, No Drawings

OPTICAL MATERIAL

This application is a continuation, of application Ser. No. 617,480 filed June 5, 1984 now abandoned.

This invention relates to a novel optical material, and more particularly to a core material for optical fibers, which has outstanding light transmission characterisitcs and heat resistance.

Plastics having the property of good transparency have hitherto been used for preparing lenses, inspection windows, illumination protective covers, optical fibers, etc.

Among such plastics, polymethyl methacrylate (PMMA) and polystyrene are excellent in said property, hence they are commonly employed as the core material of optical fibers.

However PMMA and polystyrene which are usually used for the cores of plastic optical fibers have the drawback of being low in softening temperature (up to 110° C.) and in decomposition temperature (up to 260° C.).

When an optical fiber with a core of low softening temperature is installed, for example, in the vicinity of the engine of a vehicle, the heat released from the engine readily softens the core to an uneven mutation of the refractive index of the core, causing marked scattering of light within the fiber and seriously reducing the light transmission efficiency of the fiber. Further if the polymer for forming the core has a low decomposition temperature, extreme difficulty is encountered in adjusting the melting temperature of the polymer to avoid the decomposition thereof when the polymer is to be melted for spinning.

In addition to the drawbacks mentioned above, PMMA contains a large amount of hydrogen atoms bonded to carbon atoms, so that optical materials primarily comprising PMMA suffer a great transmission loss in the red region due to absorption of vibration by the carbon-hydrogen bond. To overcome this problem, it has recently been attempted to use deuterium-substituted polymethyl methacrylate (PMMA-$d_8$) as an optical material (Published Unexamined Japanese patent application SHO 54-65556).

When an optical fiber with a core of PMMA-$d_8$ is used with a high-luminance red light-emitting diode of Ga.Al. As serving as a light source, the fiber exhibits outstanding light transmission characteristics such that signals can be transmitted over a distance of 1300 m, although optical fibers with a core of PMMA transmit signals over as short a distance as 160m. Nevertheless, PMMA-$d_8$ is low in thermal decomposition temperature and softening temperature, has low flexibility when made into a fibrous form and therefore has limited use as an optical material for optical fiber cores, etc.

An object of the present invention is to overcome the foregoing drawbacks and to provide an optical material which is outstanding in light transmission characteristics and also in heat resistance.

Another object of the invention is to provide an optical material, especially a core material for optical fibers, which has high transparency and outstanding flexibility and which is high in softening temperature and decomposition temperature.

Other objects and features of the invention will become apparent from the following description.

To fulfill the above objects, the present invention provides an optical material comprising a polymer which has a structural unit represented by the formula

wherein $X^1$ and $X^2$ are the same or different and are each hydrogen or deuterium, and $R^1$ is a chain hydrocarbon group having 1 to 5 carbon atoms, a cyclic hydrocarbon group (with or without a substituted lower alkyl group) having 3 to 6 carbon atoms or a deuterium-substituted chain hydrocarbon group having 1 to 5 carbon atoms in an amount of at least 5 mole % of the polymer.

The polymer may be a homopolymer having a structural unit represented by the formula (a) or a copolymer having a structural unit of the formula (a) and a structural unit represented by the formula

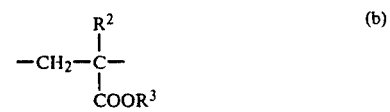

wherein $R^2$ is hydrogen or a chain hydrocarbon group having 1 to 5 carbon atoms, and $R^3$ is hydrogen, a chain hydrocarbon group having 1 to 5 carbon atoms or a cyclic hydrocarbon group (with or without substituted lower alkyl group) having 3 to 6 carbon atoms and said $R^2$ and $R^3$ may contain deuterium substituted for hydrogen.

The polymer having a structural unit of the formula (a) can be prepared from a monomer represented by the formula

wherein $X^1$, $X^2$ and $R^1$ are as defined above by subjecting the monomer (c) to homopolymerization, or by copolymerizing the monomer (c) with a monomer represented by the formula

wherein $R^2$ and $R^3$ are as defined above.

The monomer (c) which contains hydrogen as $X^1$ and $X^2$, for example, methyl-α-fluoroacrylate, can be prepared by reacting methyl monofluoroacetate with dimethyl oxalate in diethyl ether in the presence of sodium hydride to obtain methyl methoxyallylfluoroacetate, reacting the acetate with para-formaldehyde for condensation and reacting the product with sodium methylate.

Further the monomer (c) which contains deuterium as $X^1$ and/or $X^2$ can be obtained, for example, by reacting formaldehyde or deuterium-substituted formaldehyde, hydrogen fluoride and tetrafluoroethylene to obtain an oxetane represented by the formula

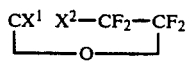

wherein $X^1$ and $R^2$ are as defined above and reacting the oxetane with a lower alcohol or a deuterium-substituted lower alcohol, sodium iodide and zinc.

Examples of such monomers (c) are

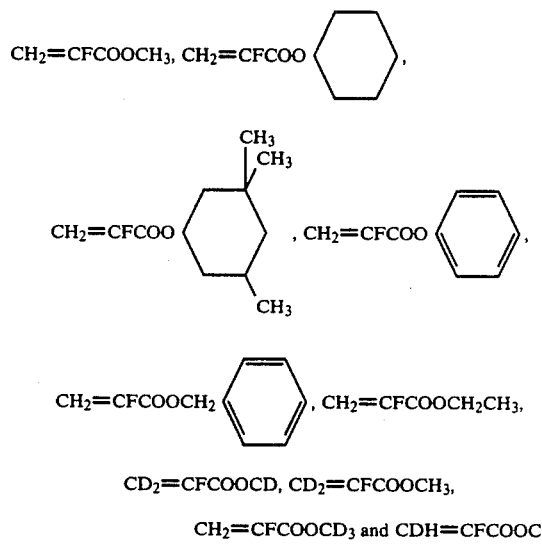

Examples of useful monomers (d) are

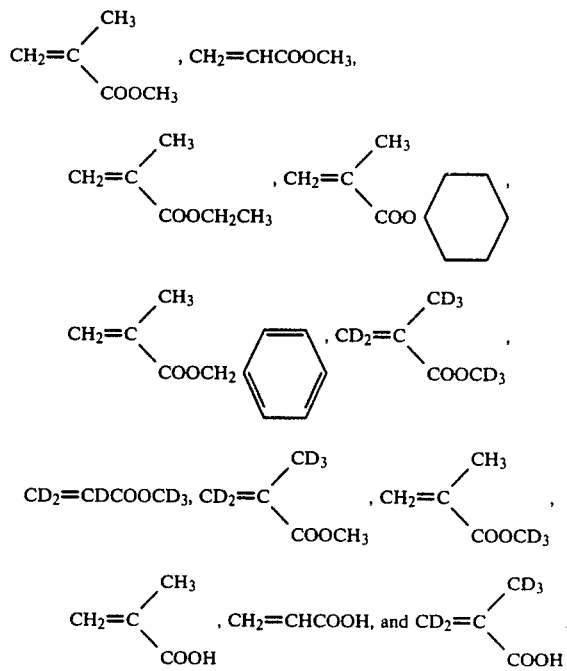

When a copolymer is to be prepared from the monomer (c) and the monomer (d), 0 to 20 moles, preferably 0 to 5 moles, of the monomer (d) is copolymerized with 1 mole of the monomer (c).

Further these monomers can be copolymerized with other comonomers such as styrene and vinyl chloride insofar as the resulting polymer has useful characteristics as an optical material of the invention.

The polymer of the invention can be prepared by a usual method of polymerization, e.g. by block, solution, suspension or emulsion polymerization.

Polymerization intiators useful for preparing the polymer of the invention are azo compounds and organic peroxides in the case of solution or suspension polymerization, such as azobisisobutyronitrile, isobutyryl peroxide, octanoyl peroxide, di-iso-propylperoxy dicarbonate and fluorine-containing organic peroxides represented by the formulae $[Cl(CF_2CFCl)_2CF_2COO]_2$, $[H(CF_2CF_2)_3COO]_2$ and $(ClCF_2CF_2COO)_2$. Initiators useful for emulsion polymerization are redox initiators consisting of oxidizing agents such as ammonium persulfate, potassium persulfate and like persulfates, and reducing agents such as sodium sulfite, ferrous sulfate and like salts of transition metals. For bulk, solution or suspension polymerization, it is desirable to use mercaptan or like chain transfer agents in order to give a higher thermal decomposition temperature to the polymer of the invention or to adjust the molecular weight thereof. The chain transfer agent is used usually in an amount of 0.01 to 1 part by weight per 100 parts by weight of the combined amount of the monomers (c) and (d).

Examples of organic media useful for solution or suspension polymerization are usually $CCl_2F_2$, $CCl_2FCClF_2$, $CClF_2CClF_2$, $$\begin{array}{c} CF_2-CF_2 \\ |\quad\quad| \\ CF_2-CF_2 \end{array}$$

and like fluorine compounds, and butyl acetate, methyl isobutyl ketone and like hydrocarbon compounds.

The polymerization temperature, which is usually in the range of from 0 to 100° C., is determined in connection with the decomposition temperature of the polymerization initiator used. Preferably the temperature is 10 to 80° C.

The pressure to be used for polymerization is 0 to 50 kg/cm² gauge.

The polymers obtained by the foregoing methods of polymerization usually range from 200,000 to 5,000,000 in molecular weight as determimed by gel permeation method and have a refractive index of 1.45 to 1.60 and a softening temperature of 100° to 200° C.

The optical material of the invention is useful for the cores of optical fibers, contact lenses, photodisks, organic glass, etc. It is especially useful for preparing optical fiber cores.

For use as a core material for optical fibers, the polymer of the invention has the feature of being higher in softening temperature and decomposition temperature than the core material (lower alkyl methacrylate polymer) which is generally used.

The methacrylate polymer having a higher softening temperature heretofore is prepared, for example, by polymerizing the methacrylate monomer which has been prepared by condensing methacrylic acid with an alcohol having a bulky hydrocarbon group. However, although having an elevated softening temperature, the polymer has poor flexibility and therefore remains to be improved for satisfactory use, while other improvements so far made are still unable to achieve good results.

Furthermore, research has yet to be made to elevate the decomposition temperature of the conventional methacrylate polymer which is low as already mentioned.

When fluorine is present in the polymer forming the cores of optical fibers, the polymer exhibits a greatly reduced refractive index, so that it has been generally thought that fluorine-containing polymers are not usable for optical fiber cores.

Nevertheless, the polymer of the invention which is useful as a core material and comprises a lower alkyl acrylate having fluorine in the α-position has an improved softening temperature and decomposition temperature as contemplated and is also highly flexible, with the reduction of refractive index minimized despite the presence of fluorine.

When the polymer of the invention is used as a core material for optical fibers, the cladding material to be used in combination therewith is a transparent material which is usually at least about 3% lower than the core material in refractive index. Examples of such materials are fluoroalkyl methacrylates disclosed in Published Unexamined Japanese patent applications SHO Nos. 52-82250, 53-60242 and 53-60243 and Published Examined Japanese patent applications SHO Nos. 43-8978, 54-24302, 56-8321, 56-8322and 56-83233, vinylidene fluoride/tetrafluoroethylene copolymers disclosed in Published Unexamined Japanese patent applications SHO Nos. 52-154645, 52-156643 and 54-80758 and Published Examined Japanese patent application SHO Nos. 53-21660, mixtures of vinylidene fluoride copolymers and polymethyl methacrylate disclosed in Published Unexamined Japanese patent application SHO No. 58-14802, and homopolymers or copolymers of various α-fluoroacrylates. While the polymer of the invention is used generally as a core material for optical fibers, those having lower refractive index may be used as a cladding material in combination of a core material having higher refractive index.

The present invention will be described in detail with reference to the following examples and comparison examples.

EXAMPLE 1

One hundred parts by weight of methyl-α-fluoroacrylate (MFA), 0.05 parts by weight of azobisisobutyronitrile and 0.025 parts by weight of n-dodecylmercaptan were subjected to bulk polymerization at 70° C. for 6 hours to obtain a polymer useful as a core material of the invention.

The molecular weight of the polymer was measured by gel permeation chromatography at room temperature using a column assembly of "Showdex A-803, A-805 and A-806" (products of Japan Waters, Ltd.), acetonitrile as solvent and polystyrene as standard sample. All the fractions were 200,000 to 5,000,000 in molecular weight.

The polymer was then checked for the following properties. Table 1 shows the results.

(1) Softening Temperature (Tg)

Using a differential scanning calorimeter (Model DSC II, product of Perkin Elemer Co.), the temperature at which the polymer started to absorb heat was measured while elevating the temperature at a rate of 20° C./min.

(2) Decomposition Temperature ($T_D$)

Using a differential thermobalance (Model DTG-30, product of Shimadzu Seisakusho, Ltd.), the temperature at which the polymer started to decrease in weight was measured while heating the polymer in air at a temperature elevating rate of 10° C./min.

(3) Refractive Index ($n_D$)

Measured at 25° C. with Abbe refractometer (product of Atago Kogakukiki Mfg. Co., Ltd.).

(4) Melt Index (MI)

A Koka flow tester, manufactured by Shimadzu Seisakusho, Ltd., was used. The polymer was placed into a cylinder having an inside diameter of 9.5 mm, maintained at 250° C. for 5 minutes and thereafter extruded through a nozzle having a length of 8 mm and an orifice diameter of 2.1 mm under a piston load of 7 kg. The amount in grams of the polymer extruded for a period of 10 minutes was measured at MI.

(5) Transmission (Tm)

An optical fiber, 330 μm in diameter and 15 μm in the wall thickness of cladding, was spun at 250° C. with use of the polymer of the invention as the core material and 2,2,3,3-tetrafluoropropyl methacrylate polymer as the cladding material. The transmission per 500-mm length of the fiber was measured with the light rays of 650 to 680 nm in wavelength.

(6) Flexibility (Fb)

The polymer of the invention was extruded by the same method as used for measuring MI, and the extrudate was drawn at 180° C. into a fiber having a diameter of 1 mm. The fiber was wound around round steel rods of varying radii to determine the radius ot the rod on which cracks developed in the fiber.

EXAMPLES 2-6

Polymers useful as core materials of the invention were prepared in the same manner as in Example 1 from methyl-α-fluoroacrylate (MFA) and methyl methacrylate (MMA) which were used in the proportions listed in Table 1. The polymers were checked for the abovementioned properties. Table 1 shows the results.

EXAMPLES 7 and 8

Polymers useful as core materials of the invention were prepared in the same manner as in Example 1 from cyclohexyl-α-fluoroacrylate (CHFA) and cyclohexyl methacrylate (CHMA) which were used in the proportions listed in Table 2. The polymers were checked for the properties with the results listed in Table 2.

COMPARISON EXAMPLE 1

Methyl methacrylate was polymerized into a homopolymer for use as a core material. The polymer was checked for properties as in Examples 1 to 8. Table 1 shows the results.

TABLE 1

|  | MFA (wt. parts) | MMA (wt. parts) | Tg (°C.) | $T_D$ (°C.) | $n_D$ | MI | Tm (%) | Fb (mm) |
| --- | --- | --- | --- | --- | --- | --- | --- | --- |
| Example |  |  |  |  |  |  |  |  |
| 1 | 100 | 0 | 131 | 324 | 1.46 | 65 | 81 | Up to 2 |

TABLE 1-continued

| | MFA (wt. parts) | MMA (wt. parts) | Tg (°C.) | T$_D$(°C.) | n$_D$ | MI | Tm (%) | Fb (mm) |
|---|---|---|---|---|---|---|---|---|
| 2 | 80 | 20 | 126 | 312 | 1.46 | 73 | 81 | Up to 2 |
| 3 | 60 | 40 | 122 | 315 | 1.47 | 62 | 81 | Up to 2 |
| 4 | 40 | 60 | 121 | 307 | 2.48 | 51 | 82 | Up to 2 |
| 5 | 20 | 80 | 113 | 294 | 1.49 | 46 | 74 | Up to 2 |
| 6 | 10 | 90 | 108 | 293 | 1.49 | 48 | 77 | Up to 2 |
| Comp. Ex. | | | | | | | | |
| 1 | 0 | 100 | 105 | 258 | 1.49 | 43 | 78 | Up to 2 |

TABLE 2

| Example | CHFA (wt. parts) | CHMA (wt. parts) | Tg (°C.) | T$_D$(°C.) | n$_D$ | MI | Tm (%) | Fb (mm) |
|---|---|---|---|---|---|---|---|---|
| 7 | 80 | 20 | 124 | 315 | 1.48 | 58 | 79 | Up to 2 |
| 8 | 100 | 0 | 135 | 337 | 1.48 | 62 | 80 | Up to 2 |

EXAMPLES 9-18

The polymer prepared in Example 1 was heated to 250° C. and extruded through a nozzle with an orifice size of 1 mm. The extrudate was drawn to 1.5 times the initial length at 180° C. to obtain an optical fiber core. The core was immersed in a solution containing 25% by weight of cladding polymer which was obtained by polymerizing a methacrylate listed in Table 3 to coat the core with the cladding polymer. The solvent for the solution was butyl acetate in Examples 9 to 15, 1,1,2-trichlorotrifluoroethane in Example 16, and hexafluorometaxylene in Examples 17 to 18. After drying the coating at 80° C., the optical fiber obtained was checked for Tm (%). Table 3 shows the results.

TABLE 3

| Example | Methacrylate | Tm (%) |
|---|---|---|
| 9 | —CH$_2$CF$_3$ | 78 |
| 10 | —CH$_2$CF$_2$CF$_3$ | 84 |
| 11 | —CH$_2$CH(CF$_3$)$_2$ | 82 |
| 12 | —CH$_2$CF(CF$_3$)$_2$ | 84 |
| 13 | —C(CF$_3$)$_3$ | 80 |
| 14 | —C(CH$_3$)$_2$CF$_2$CF$_2$H | 76 |
| 15 | —CH$_2$(CF$_2$)$_3$Cl | 76 |
| 16 | —CH$_2$CF(CF$_3$)OC$_3$F$_7$ | 80 |
| 17 | —CH$_2$CH$_2$C$_8$F$_{17}$ | 73 |
| 18 | —(CH$_2$)$_3$NSO$_2$C$_8$F$_{17}$ (with C$_3$H$_7$) | 72 |

The table shows only the R$^4$ group in each methacrylate

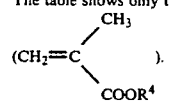

EXAMPLES 19-20

The same procedures as in Example 9 was repeated with the exception of using a cladding polymer which was prepared by copolymerizing two methacrylates listed in Table 4, which also shows the results.

TABLE 4

| Example | Methacrylate | (wt. parts) | Tm (%) |
|---|---|---|---|
| 19 | $CH_2{=}C(CH_3)COOCH_2CH_2C_8F_{17}$ | (50) | 78 |
| | and | | |
| | $CH_2{=}C(CH_3)COOCH_3$ | (50) | |
| 20 | $CH_2{=}C(CH_3)COOCH_2CH(CF_3)CH_3$ | (60) | 74 |
| | and | | |
| | $CH_2{=}C(CH_3)COOCH_3$ | (40) | |

EXAMPLES 21-24

The same core as used in Examples 9 to 18 was coated with a solution of a cladding polymer obtained by polymerizing an α-fluoroacrylate given in Table 5 to prepare an optical fiber. The solvent used was ethyl acetate in Examples 21 to 23, or a mixture of ethyl acetate and 1,1,2-trichlorotrifluoroethane (1:1 by weight) in Example 24. The concentration of the cladding polymer was 10% by weight in each of Examples. Table 5 also shows the Tm measurements obtained.

TABLE 5

| Example | α-Fluoroacrylate | Tm (%) |
|---|---|---|
| 21 | —CH$_2$CF$_3$ | 76 |

TABLE 5-continued

| Example | α-Fluoroacrylate | Tm (%) |
|---------|------------------|--------|
| 22 | —CH$_2$CH(CF$_3$)$_2$ | 81 |
| 23 | —CCF$_2$CF$_2$H with two CH$_3$ groups | 72 |
| 24 | —CH$_2$CH$_2$C$_8$F$_{17}$ | 64 |

The table shows only the R$^5$ group contained in each α-fluoroacrylate $$(CH_2=C\begin{array}{c}F\\COOR^5\end{array}).$$

EXAMPLES 25 and 26

In the same manner as in Example 1, a core polymer (Tg=138° C., MI=43) was prepared from 72 parts by weight of methyl-α-fluoroacrylate and 28 parts by weight of phenyl-α-fluoroacrylate.

In the same manner as in Example 1, an optical fiber was prepared with use of the core polymer and a cladding polymer which was a copolymer of vinylidene fluoride and tetrafluoroethylene (86:14 by weight) in Example 25, or a mixture of 70 parts by weight of this copolymer and 30 parts by weight of polymethyl methacrylate mixed together with hot rolls at 180° C. The Tm measurements (%) obtained were 72 in Example 25 and 78 in Example 78.

EXAMPLES 27–29

In the same manner as in Example 1, a copolymer or homopolymer was prepared from methyl-α-fluoroacrylate (MFA) and 3,3,5-trimethylcyclohexyl acrylate (TMCHA) which were used in proportions (100 parts by weight in combined amount) listed in Table 6, and an optical fiber was prepared with use of the polymer. Table 6 also shows the Tm measurements.

TABLE 6

| Example | MFA/TMCHA wt. ratio | Tg (°C.) | MI | Tm (%) |
|---------|---------------------|----------|-----|--------|
| 27 | 82/18 | 135 | 21 | 76 |
| 28 | 33/67 | 144 | 62 | 76 |
| 29 | 0/100 | 156 | 63 | 68 |

Given below are Reference Examples wherein monomers were prepared which are represented by the formula (a) and contain deuterium as X$^1$ and/or X$^2$, and Examples and Comparison Examples wherein optical fibers were prepared with use of polymers obtained from these monomers.

In the Examples and Comparison Examples, the weight of hydrogen atoms (remaining hydrogen) contained in the polymer was determined by the following method.

Remaining hydrogen

A solution composed of 10 g of acetone-d$_6$ and 0.130 g of benzene (containing 10 mg of hydrogen atoms) was subjected to H nuclear magnetic resonance (HNMR) analysis to determine the weight (mg) of hydrogen atoms contained in the acetone-d$_6$ from the signal intensity of hydrogen atoms in the acetone-d$_6$ and benzene relative to each other. Subsequently, a solution of 10 g of acetone-d$_6$, 0.130 g of benzene and 1 g of the polymer was subjected to HNMR analysis to determine the sum (mg) of the weight of hydrogen atoms in the acetone-d$_6$ and that of hydrogen atoms in the polymer from relative signal density. The sum minus the first-mentioned weight value of the acetone-d$_6$ gives the weight (mg) of remaining hydrogen.

REFERENCE EXAMPLE 1

(Preparation of CD$_2$=CFCOOCD$_3$)

(i) A 500 g quantity of deuterium-substituted formaldehyde and 1500 g of hydrogen fluoride were placed into an autoclave, and tetrafluoroethylene was then supplied to the autoclave until the internal pressure builded up to 8 kg/cm$^2$ gauge to react the mixture at 80° C. for 6 hours. During the reaction, the internal pressure of the autoclave was maintained at the above pressure level by continuously supplying tetrafluoroethylene to the autoclave. The reaction mixture was thereafter placed into ice water to separate off an organic layer, which was neutralized with a saturated aqueous solution of sodium hydrogencarbonate containing ice water added thereto. The organic layer was distilled to collect a fraction at 20° to 30° C. (2,2,3,3-tetrafluoro deuterium-substituted oxetane) in a yield of 340 g.

(ii) A 554 g quantity of deuterium-substituted methanol, 165 g of sodium iodide, 5 g of hydroquinone and 130 g of zinc powder were placed into a four-necked 1000-ml flask and heated to 40° C. While thoroughly stirring the mixture, a 132 g portion of the oxetane was added dropwise thereto through dropping funnel over a period of 3 hours. The resulting reaction mixture was distilled in a vacuum at 130 mm Hg to collect a fraction at 41 to 50° C., giving 83 g of α-fluoro deuterium-substituted methyl acrylate (CD$_2$=CFCOOCD$_3$).

REFERENCE EXAMPLE 2

(Preparation of CH$_2$=CFCOOC$_3$)

A 88 g quantity of the above-mentioned compound (66 mm Hg, 35° to 40° C.) was obtained in the same manner as Reference Example 1 except that formaldehyde was used in place of deuterium-substituted formaldehyde.

EXAMPLE 30

Carbon tetrachloride (500 g) and 0.01 g of azobisisobutyronitrile were placed into a four-necked 1000-ml flask, the air in the flask was replaced by nitrogen and the mixture was then heated to 70° C. While stirring the mixture, 50 g of the α-fluoro deuterium-substituted methyl acrylate (FMA) obtained in Reference Example 1 was added dropwise to the mixture through a dropping funnel over a period of 30 minutes. After the completion of addition, the mixture was further stirred for 1 hour at the same temperature. The reaction mixture was thereafter filtered by a glass filter (Pyrex 11G4, product of Iwaki Glass Co., Ltd.) to obtain a solid product, which was dried in a vacuum of 20 mm Hg at 80° C. for 16 hours, giving 48 g of a polymer of the acrylate. The polymer was 123 in MI (g), 309° C. in T$_D$ and 0.5 mg/g in remaining hydrogen content. The polymer had a molecular weight distribution of 500,000 to 2,500,000 as determined by the gel permeation method.

The polymer thus obtained was heated to 230° C. and extruded to a fibrous form by a piston extruder. The extrudate, 0.8 mm in diameter, was drawn to 1.6 times the initial length at 180° C. to prepare an optical fiber core having a diameter of 0.65 mm. A methyl isobutyl ketone solution was prepared which contained 15% by weight of a polymer of pentafluoromethacrylate

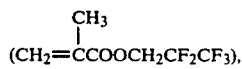

$$(CH_2=CCOOCH_2CF_2CF_3),$$

the polymer having an intrinsic viscosity (7) of 0.63 dl/g as measured at 35° C. with use of methyl ethyl ketone as solvent. The core was passed through the solution at a speed of 50 cm/min to coat the core with the methacrylate polymer. The coating was then dried at 50° C. for 5 hours to obtain an optical fiber. When the cross section of the fiber was observed electron-microphotographically, the cladding was found to have a thickness of 0.13 to 0.15 mm.

The transmission loss of the optical fiber in the red region was checked by Model FP-889, modified device of Opelecs Co., Ltd. The transmission losses at wavelengths of 694 nm and 850 nm were as low as 85 dB/km and 114 dB/km, respectively.

The optical fiber was similarly checked for transmission loss at a wavelength of 684 nm after having been allowed to stand in an atmosphere at 110° C. for 100 hours. The loss measurement was 103 dB/km, hence no noticeable reduction in performance.

When the optical fiber was checked for flexibility by being wound around steel rods, 3 mm and 1 mm in diameter, no crack developed in the fiber.

EXAMPLE 31

An optical fiber was prepared in the same manner a in Example 30 except that the cladding material used was a polymer of heptafluoroisobutyl methacrylate of the formula

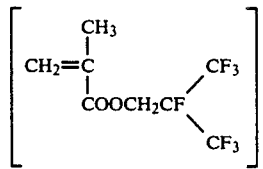

having an intrisinc viscosity (n) of 0.68 as determined by the same method as above. When checked in the same manner as in Example 30, the optical fiber was 151 dB/km in transmission loss at wavelength of 694 nm and was therefore satisfactory.

COMPARISON EXAMPLE 2

A polymer and an optical fiber were prepared in the same manner as in Example 30 except that 50 g of methyl methacrylate was used in place of 50 g of FMA-$d_5$. The transmission losses of the fiber at wavelengths of 694 nm and 850 n were as great as 440 dB/km and 2120 dB/km, respectively. When heated in the same manner as in Example 30 for the measurement of the resulting transmission loss, the fiber shrank by 30% and exhibited a seriously increased transmission loss of 890 dB/km at 694 nm.

COMPARISON EXAMPLE 3

A polymer and an optical fiber were prepared in the same manner as in Example 30 except that 50 g of deuterium-substituted methyl methacrylate (MMA-$d_8$) was used in place of 50 g of FMA-$d_5$. The polymer was 265° C. in $T_D$.

The transmission losses of the fiber at wavelengths of 694 nm and 850 nm were 138 dB/km and 172 dB/km, respectively, and are therefore low, whereas when heated at 110° C. for 100 hours, the fiber shrank, exhibiting a greatly increased transmission loss of 326 dB/km at 654 nm.

When the optical fiber was checked for flexibility in the same manner as in Example 30, cracks developed in the portion of the fiber wound around a steel rod of 1 mm in diameter.

EXAMPLES 32 and 33

Polymers and optical fibers were prepared in the same manner as in Example 30 with the exception of using 49.5 g of FMA-$d_5$ and 0.5 g of methyl acrylate (MA) in Example 32, 48.4 g of FMA-$d_5$ and 1.6 g of MA in Example 33 in place of 50 g of FMA-$d_5$ used in Example 30.

The polymers obtained in Examples 32 and 33 were respectively 141 and 184 in MI and 1.2 and 6.4 mg/g in remaining hydrogen content. The optical fibers were 132 and 680 dB/km, respectively, in transmission loss at a wavelength of 850 nm.

EXAMPLE 34

A solution comprising 100 g of $CH_2=CFCOOCD_3$ obtained in Reference Example 2, 0.1 g of t-butylmercaptan, 0.03 g of azobisisobutyronitrile and 500 g of carbon tetrachloride was maintained at 60° C. for 5 hours with stirring to polymerize the monomers. The polymer obtained was 103 in MI, 315° C. in $T_D$ and 19 mg/g in remaining hydrogen content. In the same manner as in Example 30, an optical fiber was prepared from the polymer and was checked for transmission loss at a wavelength of 850 nm. The loss measurement was 980 dB/km. When the fiber was checked for flexibility in the same manner as in Example 30, no crack occurred even in the fiber portion wound around a steel rod having a diameter of 1 mm.

EXAMPLES 35–42

The polymer prepared in Example 30 was heated to 250° C. and extruded through a nozzle with an orifice size of 1 mm. The extrudate was drawn to 1.5 times the initial length at 180° C. to obtain an optical fiber core. The core was immersed in a solution containing 25% by weight of a cladding polymer which was obtained by polymerizing a methacrylate listed in Table 7 to coat the core with the cladding polymer. The solvent for the solution was butyl acetate in Examples 35 to 39, 1,1,2-trichlorotrifluoroethane in Example 40, or hexafluorometaxylene in Examples 41 to 42. After drying the coating at 80° C., the optical fiber obtained was checked for Transmission loss (dB/Km) at wavelength of 694 nm. Table 7 shows the results.

TABLE 7

| Example | Methacrylate | Transmission loss (dB/Km) |
|---|---|---|
| 35 | —$CH_2CF_3$ | 143 |
| 36 | —$CH_2CH\begin{smallmatrix}CF_3\\CF_3\end{smallmatrix}$ | 101 |

TABLE 7-continued

| Example | Methacrylate | Transmission loss (dB/Km) |
|---|---|---|
| 37 | —C(CF$_3$)$_3$ | 76 |
| 38 | —CCF$_2$CF$_2$H with CH$_3$ groups (CH$_3$ above and below C) | 162 |
| 39 | —CH$_2$(CF$_2$)$_3$Cl | 127 |
| 40 | —CH$_2$CFOC$_3$F$_7$ with CF$_3$ | 92 |
| 41 | —CH$_2$CH$_2$C$_8$F$_{17}$ | 131 |
| 42 | —(CH$_2$)$_3$NSO$_2$C$_8$F$_{17}$ with C$_3$F$_7$ | 145 |

The table shows only the R$^4$ group in each methacrylate

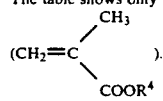).

EXAMPLES 43–44

In the same manner as in Examples 35–42, an optical fiber was prepared with use of the core polymer same as in Examples 35–42 and a cladding polymer which was obtained by polymerizing a methacrylate listed in Table 8 (with use of butylacetate as the solvent).

The optical fibers were tested for Transmission loss (dB/Km) at wavelength of 694 nm. The results are shown in Table 8.

TABLE 8

| Example | Methacrylate | | Transmission loss (dB/km) |
|---|---|---|---|
| 43 | CH$_2$=C(CH$_3$)COOCH$_2$CH$_2$C$_8$F$_{17}$ | (50) | 112 |
| | and | | |
| | CH$_2$=C(CH$_3$)COOCH$_3$ | (50) | |
| 44 | CH$_2$=C(CH$_3$)COOCH$_2$CH(CF$_3$)CH$_3$ | (60) | 135 |
| | and | | |
| | CH$_2$=C(CH$_3$)COOCH$_3$ | (40) | |

EXAMPLES 45–48

In the same manner as in Examples 35–42, an optical fiber was prepared with use of the core polymer same as in Examples 35–42 and a cladding material which was obtained by polymerizing an α-fluoroacrylate listed in Table 9. The solvent for the coating solution was butylacetate in Examples 45–47, and a mixture of butylacetate and 1,1,2-trichlorofluoroethane in a ratio of 1 by weight in Example 48. The concentration of the polymer in the solution was 10% by weight in each Example. Table 9 shows the transmission loss at 694 nm of the resulting fiber.

TABLE 9

| Example | α-fluoroacrylate | Transmission loss (dB/Km) |
|---|---|---|
| 45 | —CH$_2$CF$_3$ | 127 |
| 46 | —CH$_2$CH(CF$_3$)(CF$_3$) | 93 |
| 47 | —CCF$_2$CF$_2$H with CH$_3$ (CH$_3$ above and below C) | 131 |
| 41 | —CH$_2$CH$_2$C$_8$F$_{17}$ | 148 |

We claim:

1. In an optical fiber comprising a cladding and a core, the improvement wherein said core consists essentially of a homopolymer which has a structural unit represented by the formula

wherein X$^1$ and X$^2$ are the same or different and each represent hydrogen or deuterium, and R$^1$ is a chain hydrocarbon group having 1 to 5 carbon atoms, a cyclic hydrocarbon group having 3 to 6 carbon atoms with or without a lower alkyl group or a deuterium-substituted chain hydrocarbon group having 1 to 5 carbon atoms, said polymer having a refractive index of 1.45 to 1.60 and a softening temperature of 100° to 200° C.

2. In an optical fiber comprising a cladding and a core, the improvement wherein said core consists essentially of a polymer which has at least 5% by weight of a structural unit represented by the formula

wherein X$^1$ and X$^2$ are the same or different and each represent hydrogen or deuterium, and R$^1$ is a chain hydrocarbon group having 1 to 5 carbon atoms, a cyclic hydrocarbon group having 3 to 6 carbon atoms with or without a lower alkyl group or a deuterium-substituted chain hydrocarbon group having 1 to 5 carbon atoms, and not more than 95% by weight of a structural unit represented by the formula

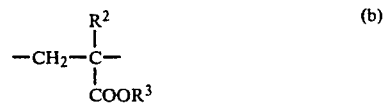

wherein $R^2$ is hydrogen, deuterium, a chain hydrocarbon group having 1 to 5 carbon atoms or a deuterium-substituted chain hydrocarbon group having 1 to 5 carbon atoms and $R^3$ is hydrogen, deuterium, a chain hydrocarbon group having 1 to 5 carbon atoms, a cyclic hydrocarbon group having 3 to 6 carbon atoms with or without a lower alkyl group, deuterium-substituted chain hydrocarbon group having 1 to 5 carbon atoms, or a deuterium-substituted cyclic hydrocarbon group having 3 to 6 carbon atoms with or without a lower alkyl group, said copolymer having a refractive index of 1.45 to 1.60 and a softening temperature of 100° to 200° C.

* * * * *